US010334642B2

(12) United States Patent
Zhu et al.

(10) Patent No.: US 10,334,642 B2
(45) Date of Patent: Jun. 25, 2019

(54) DEVICE, SYSTEM AND METHOD USING NON IP-BASED EPS BEARER

(71) Applicant: Intel Corporation, Santa Clara, CA (US)

(72) Inventors: Jing Zhu, Portland, OR (US); Satish Chandra Jha, Hillsboro, OR (US); Rath Vannithamby, Portland, OR (US); Mohammad Mamunur Rashid, Hillsboro, OR (US); Maruti Gupta Hyde, Portland, OR (US); Kathiravetpillai Sivanesan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/747,285

(22) PCT Filed: Nov. 3, 2015

(86) PCT No.: PCT/US2015/058724
§ 371 (c)(1),
(2) Date: Jan. 24, 2018

(87) PCT Pub. No.: WO2017/023346
PCT Pub. Date: Feb. 9, 2017

(65) Prior Publication Data
US 2018/0220478 A1  Aug. 2, 2018

Related U.S. Application Data

(60) Provisional application No. 62/199,553, filed on Jul. 31, 2015.

(51) Int. Cl.
*H04W 4/70* (2018.01)
*H04L 29/06* (2006.01)
(Continued)

(52) U.S. Cl.
CPC ............ *H04W 76/12* (2018.02); *H04L 45/306* (2013.01); *H04L 69/00* (2013.01); *H04W 4/70* (2018.02);
(Continued)

(58) Field of Classification Search
CPC ............ H04B 7/18528; H04B 7/18571; H04B 7/18576; H04W 84/06; H04W 76/12;
(Continued)

(56) References Cited

U.S. PATENT DOCUMENTS 7,639,648 B2 * 12/2009 Nagarajan ............... H04W 8/12
370/220
7,804,806 B2 *  9/2010 Borkar .................... H04L 45/16
370/328

(Continued)

FOREIGN PATENT DOCUMENTS

WO      2014013057        1/2014
WO      WO-2014011008 A1  1/2014

OTHER PUBLICATIONS

"International Application Serial No. PCT/US2015/058724, International Search Report dated Apr. 29, 2016", 3 pgs.

(Continued)

*Primary Examiner* — Sharad Rampuria
(74) *Attorney, Agent, or Firm* — Schwegman Lundberg & Woessner, P.A.

(57) ABSTRACT

Devices and methods of using a reduced complexity network protocol are generally described. An evolved NodeB (eNB) transmits an Attach Request to a mobility management entity (MME), which transmits a Create Session Request for transmission of non-IP (NIP) data of user equipment (UE) to a Packet Data Network (P-GW). The P-GW in response transmits a Create Session Response, with the UE ID if originating at the P-GW and free from a (Continued)

UE IP address and an Up Link Traffic Flow Template, to the MME, which transmits an Attach Accept to the eNB and UE. A UE identifier (UE ID) either originates at the UE and is transmitted in the Attach Request, or is generated by the eNB, MME or P-GW. The NIP data has a tunneling NIP data packet with a NIP header with the UE ID and a NIP user data packet free from TCP/IP encapsulation and header compression.

28 Claims, 6 Drawing Sheets

(51) Int. Cl.

| | |
|---|---|
| *H04W 28/02* | (2009.01) |
| *H04W 40/02* | (2009.01) |
| *H04W 48/20* | (2009.01) |
| *H04W 60/00* | (2009.01) |
| *H04W 76/11* | (2018.01) |
| *H04W 76/12* | (2018.01) |
| *H04W 80/04* | (2009.01) |
| *H04W 80/06* | (2009.01) |
| *H04L 12/725* | (2013.01) |
| *H04W 8/26* | (2009.01) |
| *H04W 36/08* | (2009.01) |

(52) U.S. Cl.
CPC ........... *H04W 40/02* (2013.01); *H04W 48/20* (2013.01); *H04W 60/00* (2013.01); *H04W 76/11* (2018.02); *H04W 8/26* (2013.01); *H04W 28/0215* (2013.01); *H04W 36/08* (2013.01); *H04W 80/04* (2013.01); *H04W 80/06* (2013.01)

(58) Field of Classification Search
CPC ....... H04W 48/20; H04W 76/11; H04W 4/70; H04W 40/02; H04W 60/00; H04W 28/0215; H04W 80/06; H04W 80/04; H04L 45/306; H04L 69/00
See application file for complete search history.

(56) References Cited

U.S. PATENT DOCUMENTS

| | | | |
|---|---|---|---|
| 9,602,227 B2* | 3/2017 | Tjahjono | ................ H04H 20/72 |
| 2013/0080597 A1* | 3/2013 | Liao | ...................... H04L 5/0001 |
| | | | 709/219 |
| 2013/0272247 A1 | 10/2013 | Guo | |
| 2013/0301611 A1 | 11/2013 | Baghel et al. | |
| 2014/0105011 A1 | 4/2014 | Chandramouli et al. | |
| 2014/0341124 A1 | 11/2014 | Ronneke et al. | |
| 2015/0071169 A1 | 3/2015 | Wang | |
| 2015/0201323 A1 | 7/2015 | Tjahjono et al. | |

OTHER PUBLICATIONS

"International Application Serial No. PCT/US2015/058724, Written Opinion dated Apr. 29, 2016", 5 pgs.
"Support for non IP PDN connections", S2-152701 3rd Generation Partnership Project (3GPP), Mobile Competence Centre, (Jul. 17, 2015).
"European Application Serial No. 15900603.0, Extended European Search Report dated Jan. 24, 2019", 13 pgs.

* cited by examiner

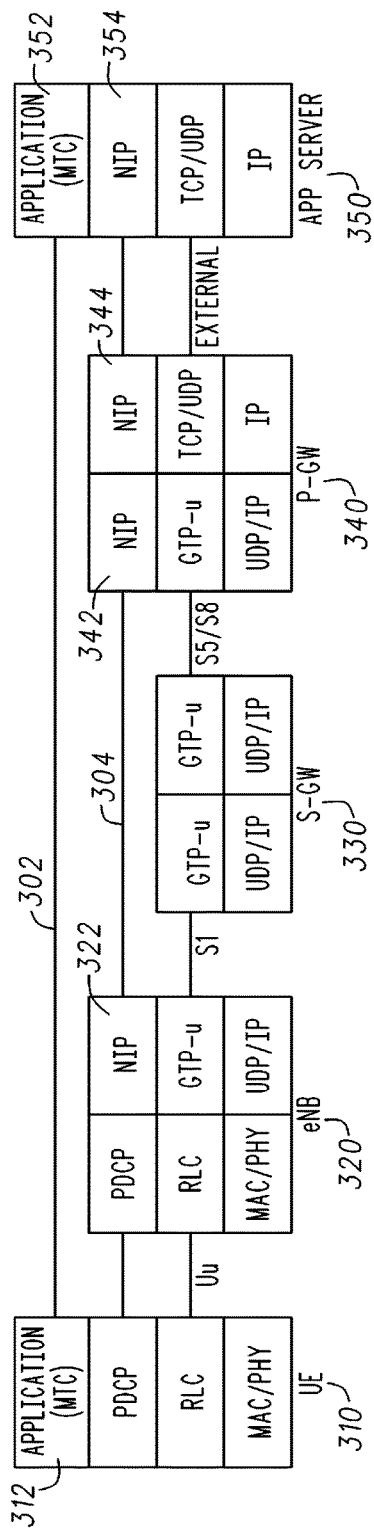
FIG. 3
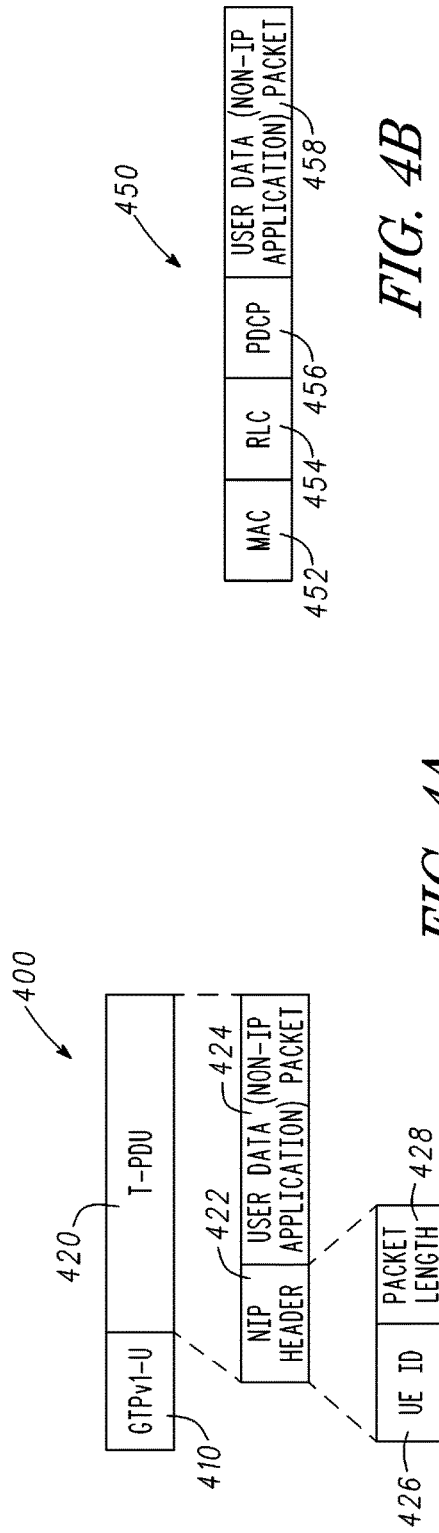
FIG. 4A
FIG. 4B

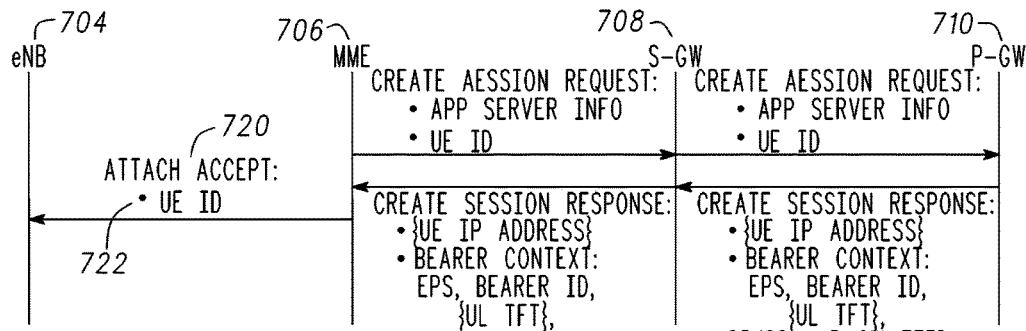
FIG. 7
FIG. 8
FIG. 9A
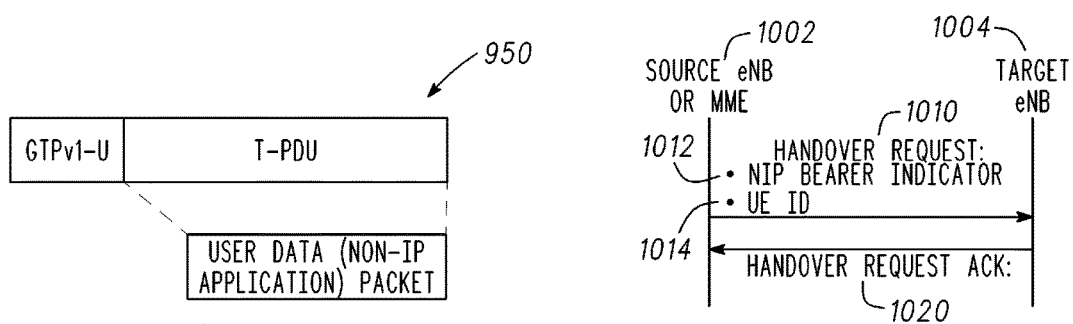
FIG. 9B
FIG. 10

DEVICE, SYSTEM AND METHOD USING NON IP-BASED EPS BEARER

PRIORITY CLAIM

This application is a U.S. National Stage Filing under 35 U.S.C. 371 from International Application No. PCT/US2015/058724, filed Nov. 3, 2015 and published in English as WO 2017/023346 on Feb. 9, 2017, which claims the benefit of priority to U.S. Provisional Patent Application Ser. No. 62/199,553, filed, Jul. 31, 2015, and entitled "DEVICE, SYSTEM AND METHOD USING NON IP-BASED EPS BEARER," each of which is incorporated herein by reference in its entirety.

TECHNICAL FIELD

Embodiments pertain to radio access networks. Some embodiments relate to Non-Internet Protocol (Non-IP) bearer communications in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

Use of Third Generation Long Term Evolution (3GPP LTE) systems and LTE advanced (LTE-A) networks continues to increase quickly. In part this may be due to the penetration of user equipment (UE) such as smartphones and other data-intensive devices and applications into all parts of modern life. UEs that individually consume significant amounts of bandwidth (through the use of streaming video and other bandwidth-intensive applications) are, however, not the only types of device that swallow network resources. The introduction and exceedingly rapid surge in use of low bandwidth devices, in particular Machine Type Communication (MTC) UEs used in the Internet of Things (IoT), has continued to increase the demand for spectrum. Examples of MTC UEs include sensors (e.g., sensing environmental conditions) or microcontrollers in appliances or vending machines. MTC UEs pose a particular challenge for communication networks and device manufacturers as it is typically desired for such UEs to be low cost and low power, leading to UEs that are less computationally powerful and have less power for communication.

Spectrum has accordingly become more and more of a premium. However, while reducing spectrum usage may be desirable, maintaining user experience and network access may also be taken into account. It would be therefore desirable to provide a network protocol that would enable reduced communication complexity for UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3 illustrates a user-plane Non-IP based EPS Bearer Protocol Stack in accordance with some embodiments.

FIGS. 4A and 4B illustrate a Non-Internet Protocol transport protocol data unit (T-PDU) in a General Packet Radio Service (GPRS) Tunneling Protocol User Plane (GTP-u) packet and Packet Data Convergence Protocol (PDCP) packet, respectively, in accordance with some embodiments.

FIG. 7 illustrates establishment of another Non-IP EPS bearer in accordance with some embodiments.

FIG. 8 illustrates establishment of another Non-IP EPS bearer in accordance with some embodiments.

FIGS. 9A and 9B illustrate establishment of a Non-IP EPS bearer with inexplicit UE identification and corresponding data packet in accordance with some embodiments.

FIG. 10 illustrates handover of a Non-IP EPS bearer in accordance with some embodiments.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
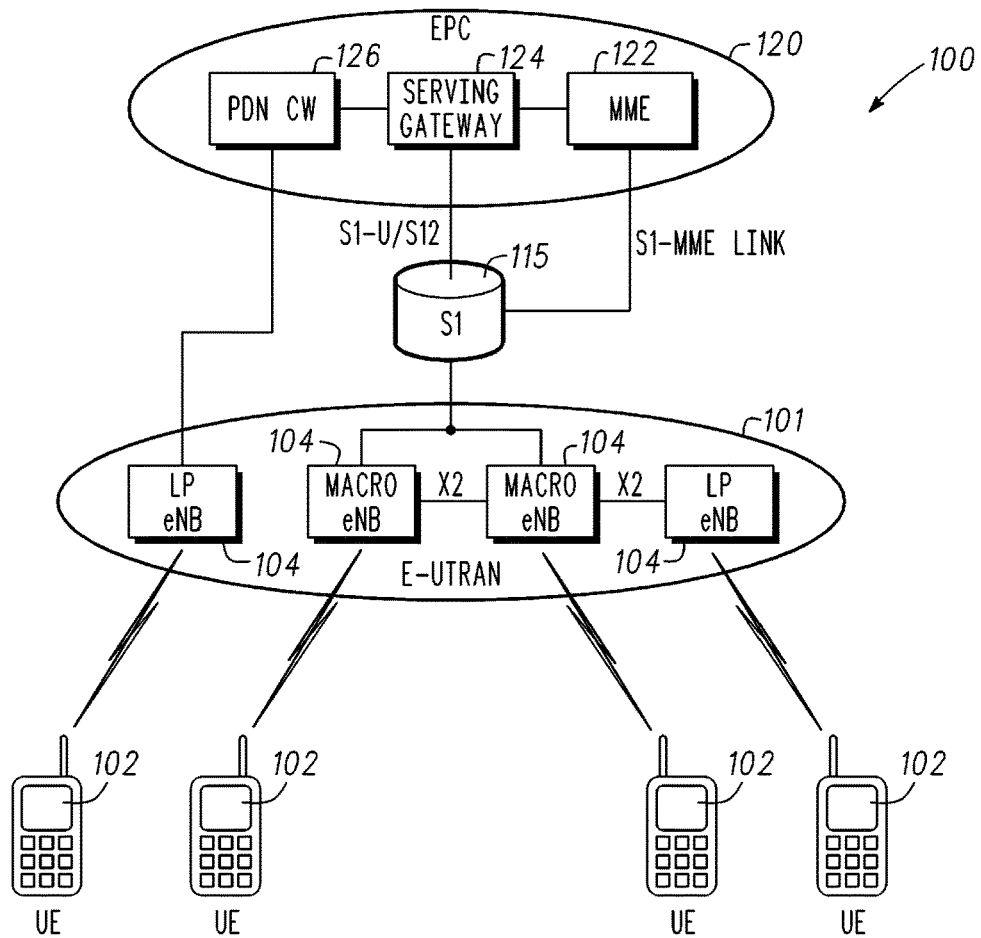
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW or S-GW) 124, and packet data network gateway (PDN GW or P-GW) 126. The RAN 101 may include evolved node Bs (eNBs) 104 (which may operate as base stations) for communicating with user equipment (UE) 102. The eNBs 104 may include macro eNBs and low power (LP) eNBs. The core network 120 may employ the reduced network protocol as described herein.

The MME 122 may be similar in function to the control plane of legacy Serving GPRS Support Nodes (SGSN). The MME 122 may manage mobility aspects in access such as gateway selection and tracking area list management. The S-GW 124 may terminate the S1/S12 interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The S-GW 124 and the MME 122 may be implemented in one physical node or separate physical nodes.

The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the S-GW 124 may be implemented in a single physical node or separate physical nodes. The PDN GW 126 and the S-GW 124 may be connected through the S5/S8 interface (where the S5 interface is used when the UE 102 is not roaming, i.e., PDN GW 126 and the S-GW 124 belong to the same Public Land Mobile Network (PLMN), and the S8 interface is used when the UE 102 is roaming between different operators so that the PDN GW 126 and the S-GW 124 belong to the different PLMNs). The S5/S8 interface may be used to transfer user packet data between the P-GW 126 and the S-GW 124 and to setup associated bearers resources.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term low power (LP) eNB refers to any suitable relatively low power eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 2:
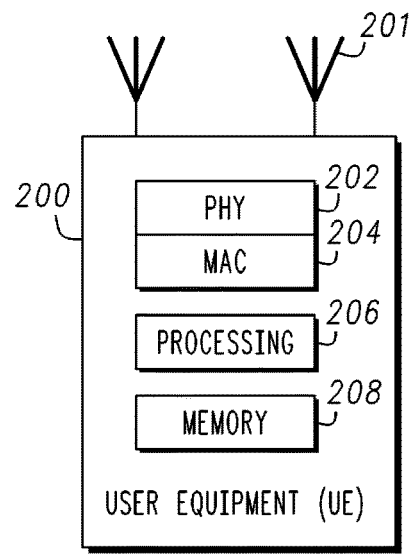
FIG. 2 illustrates a functional block diagram of a communication device in accordance with some embodiments.
Figure 12:
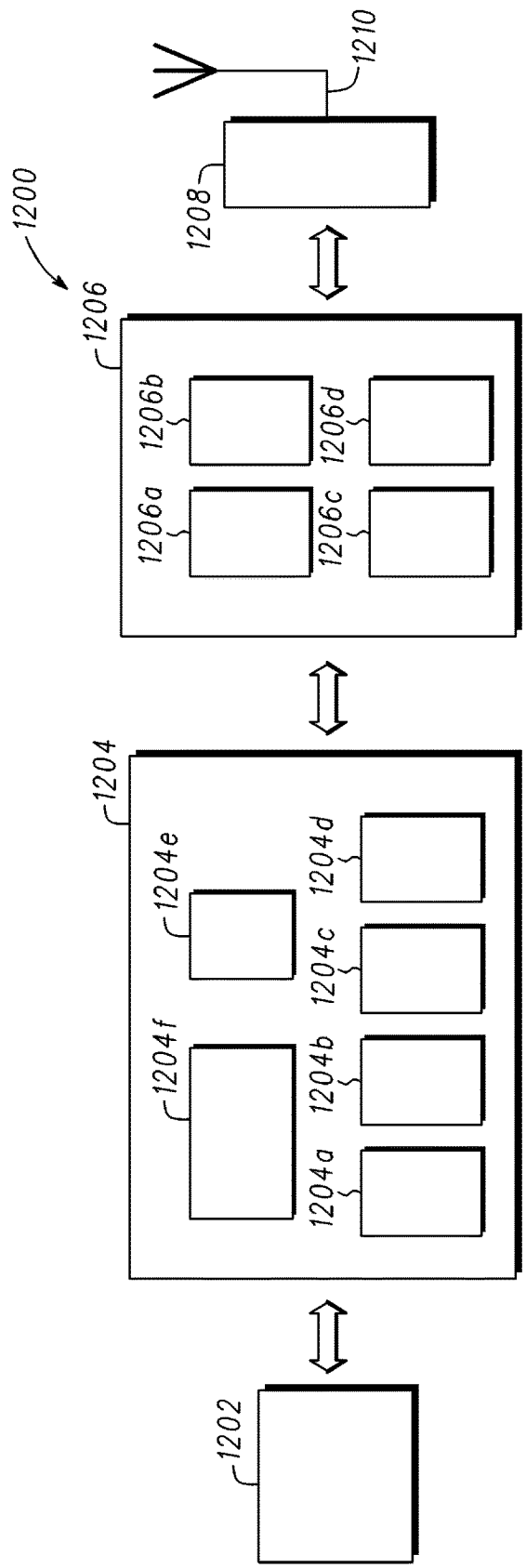
FIG. 12 illustrates a functional block diagram of a UE in accordance with some embodiments.

FIG. 2 illustrates a functional block diagram of a communication device in accordance with some embodiments. The device may be a UE, eNB, MME, P-GW or S-GW for example, such as those shown in FIG. 1 that may be configured to use the protocol as described herein. FIG. 12 illustrates a further embodiment of a UE in accordance with some embodiments. In some embodiments, the eNB 104 may be a stationary non-mobile device. The communication device 200 may include physical layer (PHY) circuitry 202, such as a transceiver, for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. In some embodiments, such as an MME, S-GW or P-GW, the PHY circuitry 202 may include an interface configured to communicate over a wired network.

Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

The physical layer circuitry 202, MAC circuitry 204 and processing circuitry 206 may handle various radio control functions that enable communication with one or more radio networks compatible with one or more radio technologies. The radio control functions may include signal modulation, encoding, decoding, radio frequency shifting, etc. For example, in some embodiments, communication may be enabled with one or more wireless metropolitan area networks (WMAN), a wireless local area network (WLAN), and a wireless personal area network (WPAN). In some embodiments, the communication device 200 can be configured to operate in accordance with 3GPP standards or other protocols or standards, including Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $1/10$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a 3$^{rd}$ Generation Partnership Project (3GPP) Universal Terrestrial Radio Access Network (UTRAN) or a LTE communication network, an LTE-Advanced communication network, a fifth generation (5G) or later LTE communication network or a high speed downlink/uplink access (HSDPA/HSUPA) communication network, although the scope of the invention is not limited in this respect.

As above, it may be desirable to reduce the complexity, and thus computing power, of either communications by UEs 102 or the UEs 102 themselves. UEs 102 may typically implement Transmission Control Protocol/Internet Protocol (TCP/IP) stacks, increasing the complexity of the UEs and processing provided by the processing circuitry 206 due to the formatting and compression used in the protocol. To reduce the cost and complexity of UEs, especially but not only MTC UEs, some embodiments may provide support of Non-IP (NIP) Evolved Packet switched System (EPS) bearers to enable a UE to deliver an application packet (NIP packet for a particular user application) without any TCP/IP encapsulation. Moreover, a lightweight protocol, referred to herein as NIP encapsulation, may be used to encapsulate non-IP traffic over the S1, S5/S8 or S12 interface. These embodiments are described in more detail is below.

Use of the NIP EPS bearer may reduce UE complexity in a number of ways. For example, the NIP EPS bearer may eliminate use of the TCP/IP stack and the header compression for NIP packets, reduce user-plane overhead caused by creating the TCP/IP header, and reduce control-plane overhead caused by IP address allocation. These embodiments are described in more detail below.

FIG. 3 illustrates a user-plane Non-IP based EPS Bearer Protocol Stack in accordance with some embodiments. The user-plane Non-IP based EPS Bearer Protocol Stack may include a UE 310, eNB 320, S-GW 330, P-GW 340 and Application Server 350. Unlike IP-based EPS bearers, in which both default and dedicated EPS bearers may be available, the UE 310 may, in some embodiments, only have one EPS bearer if the non-IP based EPS bearer is activated. As shown in FIG. 3, control data 302 is provided between the application layer 312 of the UE 310 and the application layer 352 of the application server 350. User-plane data may be provided from the UE through the LTE air interface physical layer (Uu) to the eNB 320.

As specified in TS 29.281, General Packet Radio Service (GPRS) Tunneling Protocol User Plane (GTP-U) tunnels may be used to carry encapsulated transport protocol data units (T-PDUs) between a given pair of GTP-U tunnel endpoints over an S1 interface (eNB 320-S-GW 330), S5/S8 interface (S-GW 330-P-GW 340) or S12 reference point (P-GW 340—Application server 250). As shown in FIG. 3, the NIP reference point 322 of the eNB 320 may tunnel 304 to the internal NIP reference point 342 of the P-GW 340 without being affected by the S-GW 330. Similarly, the external NIP reference point 344 of the P-GW 340 may tunnel to the NIP reference point 354 of the Application server 354. FIGS. 4A and 4B illustrate a NIP T-PDU in a GTP-U packet in accordance with some embodiments. A G-PDU packet 400 may contain a GTP-U header 410 (shown in FIG. 4A as a GTP version 1-u header) and a user data packet T-PDU 420 (for example, an IP datagram).

The user-plane path for IP bearers is shown in the lower portion of FIG. 3. The NIP protocol 304 for tunneling Non-IP packets (T-PDU) between the eNB 320 and P-GW 340 is shown in the upper portion of FIG. 3. The NIP protocol layer 322 of the eNB 320 may thus communicate with an internal NIP protocol layer 342 of the P-GW 340 so that NIP packets may be transmitted therebetween. In the NIP protocol 304, as shown in FIG. 4A, a T-PDU 420 may include a fixed length NIP header 422 and a NIP user data packet (i.e., a user data packet for a NIP application) 424. The NIP header 422 may contain fields whose content is different from that of IP packets.

Specifically, as shown in FIG. 4A, the NIP header 422 of the NIP packet 400 may contain a UE ID field 422 whose contents uniquely identify the UE that is the source or destination of the NIP packet 400. Unlike the identifier of IP packets, which may be the IP address of the UE, the NIP packet 400 may use an identifier that is based on non-IP information of the UE or that is assigned by a network entity (e.g. eNB, MME, or P-GW) for the UE 310. Thus, if the identifier originates at the UE 310, the information used may be related to the UE itself (i.e., internal to the UE) independent of the network. One such UE-based identifier may be the International Mobile Equipment Identity (IMEI). The identifier may also originate at the eNB 320 or P-GW 340, in which case it may thereafter be conveyed to the UE 310. The UE ID 426 may thus replace an IP address to identify to which UE a NIP data packet 400 belongs. An example, on the other hand, of a network-based identifier may be a Cell Radio Network Temporary Identifier (C-RNTI), which is allocated by the eNB 320 and is unique within the cell. In addition to the UE ID 426, the NIP header 422 may also contain a packet length field 428 whose contents indicate the length of the user data packet 424 following the NIP header 422. In some embodiments, the UE ID field 426 used for tunneling between the eNB 310 and the P-GW 340 may contain an Internal UE ID and the UE ID field 426 used for tunneling for between the P-GW 340 and the Application Server 350 may contain an External UE ID. The length and/or the value of the internal and external UE IDs may be different. If an internal and external UE ID is different, the P-GW 340 may be responsible for mapping between the internal and external UE ID. The NIP packet 400 may contain either the internal or external UE ID. The P-GW 340 may be responsible for altering the UE ID field 426 of the NIP header 422 to change the contents of the UE ID field 426 depending on whether the P-GW 340 is routing the internal and external UE ID internally within the network (e.g., to the eNB 310) or externally (e.g., to the Application Server 350).

FIG. 4B illustrates a Packet Data Convergence Protocol (PDCP) packet. The over-the-air PDCP packet 450 transmitted between the UE 310 and the eNB 320 may contain a header and payload 458. The header may include a media access control (MAC) layer 452, a Radio Link Control (RLC) layer 454 and a PDCP layer 456.

Figure 5:
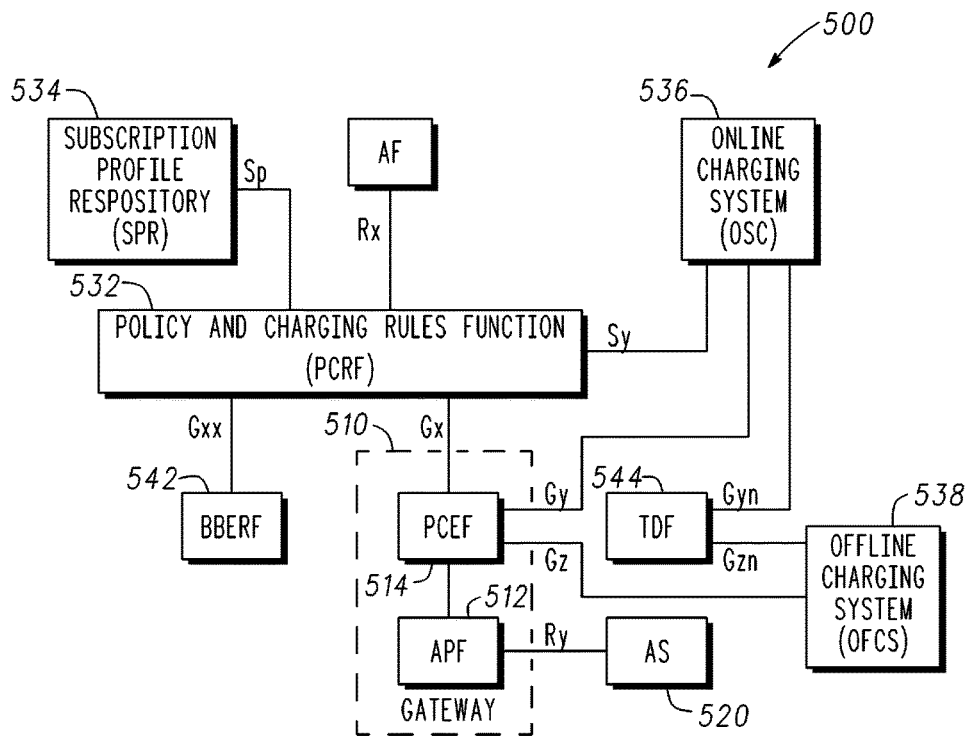
FIG. 5 illustrates an enhanced Policy Charging and Control (PCC) Architecture in accordance with some embodiments.

FIG. 5 illustrates an enhanced Policy Charging and Control (PCC) Architecture in accordance with some embodiments. In the PCC architecture 500 of the NIP EPS bearer system, the P-GW 510 may establish IP connections on behalf of a NIP UE (not shown in FIG. 5) with the corresponding Application Server 520 for delivering a NIP user data (application) packet. In FIG. 5, the P-GW 510 contains an Application Proxy Function (APF) 512. The APF 512 may be internal to the P-GW 510. The Application Server (AS) 520 may be the 3$^{rd}$ party application server or may be internal to the network or operator.

A Policy and Charging Rules Function node (PCRF) 532 in the PCC architecture 500 may make traffic policing and other policy and charging control decisions. The PCRF 532 may be in communication with a subscription profile repository (SPR) 534 through an SP interface that may maintain subscriber profiles including Quality of Service (QoS) and charging subscription policies associated with subscribers or UEs. An online charging system (OCS) 536 and Offline Charging System (OFCS) 538 may each maintain policy counter information for subscribers or subscriptions and communicate with a Policy and Charging Enforcement Function (PCEF) 514 of the P-GW 510 respectively through Gy and Gz interfaces. The PCEF 514 and PCRF 531 may communicate over the Gx interface to provision/remove of PCC rules from the PCRF 531 to the PCEF 514 and transmit traffic plane events from the PCEF 514 to the PCRF 532. A bearer binding and event reporting function (BBERF) 542 may apply QoS rules to service data flows (e.g., packet flows of a particular service type from the UE) and binding of the service data flows to access bearers in the bearer plane.

The P-GW 510, as above, may include the APF 512 and PCEF 514, which enforces the PCC rules for the service data flows. The APF 512 may be connected via a Ry reference point to the Application Server 520. The P-GW 510 may also be connected to a Traffic Detection Function (TDF) 544 that enforces traffic policies based on pre-set rules or dynamically determined rules by the PCRF 532 on data flows in real time. The TDF 544 may thus be connected with the PCRF 532 through an Sd interface and with the OCS 536 and OFCS 538 through Gyn and Gzn interfaces, respectively.

The Ry reference point may enable transport of user data packets via IP connections between the P-GW 510 and the corresponding Application Server 520 for non-IP EPS bearers. The Ry reference point may support a per-UE IP connection in which an individual IP connection may be established for each UE. The Ry reference point may additionally or instead support a per-AS IP connection in which an IP connection may be established for each AS and the data packets of all UEs associated with the same AS may be delivered using the same IP connection. With the per UE IP connection, the TCP or UDP port number at the P-GW 510 may be used to differentiate among the UEs. A per-AS IP connection however, may be one TCP or UDP port number for a plurality of UEs (e.g., all of the UEs). The NIP protocol may be used over the Ry reference point so that the UE ID field in the NIP header can be used to differentiate UEs at the eNB (not shown in FIG. 5). The per-AS IP connection may permit scalability as the number of IP connections may not increase with the number of UEs. This may be useful for supporting a huge number of UEs, such as the ever-increasing number of MTC UEs. In some embodiments, the type of IP connection may depend on the type of UE, as above, MTC UEs may use a per-AS IP connection while normal UEs (non-MTC UEs such as smartphones) may use a per-UE IP connection.

Figure 6:
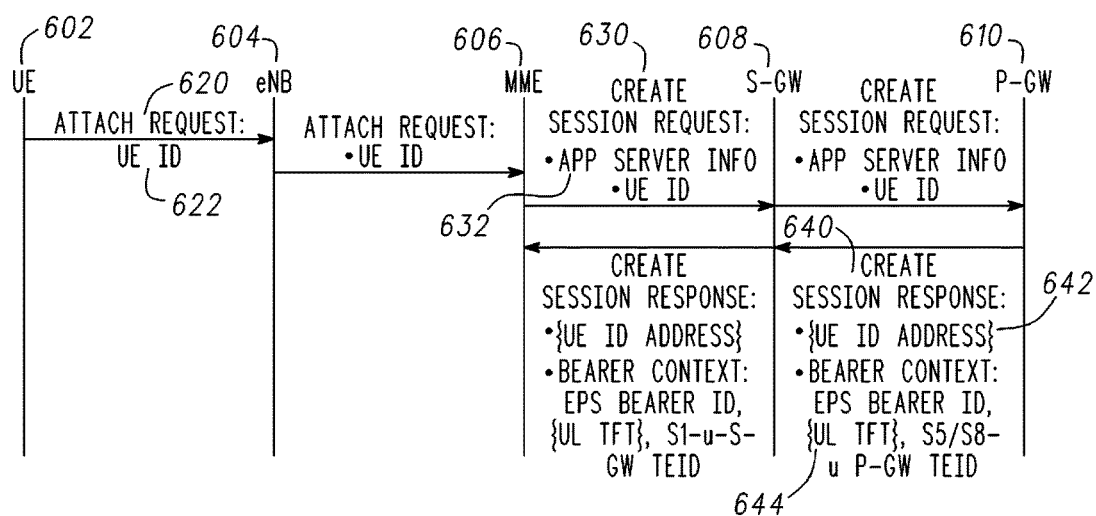
FIG. 6 illustrates establishment of a Non-IP Evolved Packet switched System (EPS) bearer in accordance with some embodiments.

FIG. 6 illustrates establishment of a Non-IP EPS bearer in accordance with some embodiments. The UE 602 may initiate the process of establishing a NIP EPS bearer by transmitting an Attach Request 620 to the eNB 604. The Attach Request 620 may be initial attachment of the UE 602 to the network, e.g., during power up, or may be attachment due to handover between networks. The UE 602 may in this embodiment generate the UE ID 622. Thus, the Attach Request 620 may contain, as shown in FIG. 6, the UE ID 622. The UE ID 622 may include the Internal UE ID. In some embodiments, the eNB 604 may instead generate the UE ID 622, having received an Attach Request 620 from the UE 602 without the UE ID 622, or having itself initiated the Attach Request 620. The eNB 604 may relay the Attach Request 620 containing the UE ID 622 to the MME 606.

The MME 606, in response to receiving the Attach Request 620 from the eNB 604, may form a Create Session Request 630. The Create Session Request 630 may contain both the UE ID 622 and Application Server Information 632 contained in an Application Server Info parameter. The Application Server Information 632 may indicate with which Application Server to set up a NIP EPS bearer. The Application Server Info parameter in the Create Session Request 630 may include the IP address Type: IPv4 or IPv6, the IP address, the Protocol Type: UDP or TCP and the Port Number for the NIP EPS bearer. The MME 606 may obtain the Application Server Info for the UE 602 based on the subscription information of the UE 602, or from UE itself through Non-Access Stratum (NAS) messages during the initial attach procedure. The Create Session Request 630 may be transmitted by the MME 606 to the S-GW 608, where it may then be forwarded to the P-GW 610. In some embodiments, rather than the P-GW 610 obtaining the Application Server Info from the MME 606, the P-GW 610 may obtain the Application Server Info for the UE 602 from the SPR. Alternatively, the P-GW 610 may be pre-configured with Application Server Info based on other information, such as APN.

The P-GW 610, having received the Create Session Request 630, may in response use address information of the Application Server (not shown in FIG. 6) to establish the Ry reference point for a NIP UE. Also in response to the Create Session Request, the P-GW 610 may transmit a Create Session Response 640 through the S-GW 608 to the MME 606. The Create Session Response 640 for the NIP EPS bearer may include a bearer context indicating that the bearer is an EPS bearer, a bearer ID identifying the bearer, and a S5/S8-u P-GW Tunnel Endpoint Identifier (TEID) indicating the identification of the P-GW. Unlike a Create Session Response that may be associated with generation of an IP EPS bearer, the Create Session Response 640, however, may contain neither the UE IP address 642 of the UE 602 nor the Uplink Traffic Flow Template (UL TFT) 644, which defines rules so that UE 602 and network knows which IP packet should be sent on particular dedicated bearer.

The UE ID 622 may eventually be used in the NIP header of the non-IP GTP-u packet above to uniquely identify from which UE the NIP packet originates once the NIP EPS bearer is established. As above, the UE ID 622 may be the C-RNTI in one example. Thus, as shown in FIG. 6, the eNB 604 may include the C-RNTI of the UE 602 in the S1-MME message (e.g. Attach Request 620) to the MME 606 during the initial attach procedure. After the attach procedure, application traffic may be able to be delivered over the air from the eNB 604 to the UE 602 without TCP/IP encapsulation.

Although the C-RNTI of the UE 602 may be used as the UE ID 622, the C-RNTI of the UE 602 may only remain the same when attached to the same eNB 604. In some embodiments, however, the UE 602 may be mobile and thus may not remain connected to the same eNB at all times. Establishing a NIP bearer for different eNBs may be complicated when the UE ID changes. It may thus be desirable to allow the UE ID to remain the same even after UE 602 moves to a different eNB. In embodiments in which the network determines the UE ID 622, instead of the eNB 604 determining the UE ID 622, a non-localized network element such as the MME 604 or the P-GW 610 may establish the UE ID 622. In this case, even if UE 602 moves from one serving eNB to another, the UE ID 622 may be able to stay the same, and can be used continuously over the S1 or S5/S8 GTP-u tunnels without having to re-establish the NIP bearer.

FIG. 7 illustrates establishment of another Non-IP EPS bearer in accordance with some embodiments. In FIG. 7, like the method of FIG. 6, the UE (not shown) may initiate the process of establishing a NIP EPS bearer by transmitting an Attach Request to the eNB 704. However, the Attach Request may not contain the UE ID 722. The eNB 704 may relay the Attach Request to the MME 706.

As shown in FIG. 7, the MME 706 may be responsible for determining the UE ID 722 during the initial attach procedure. The UE ID 722 may thus originate at the MME 706. This is to say that the MME 706, in response to receiving the Attach Request from the eNB 704, may form a Create Session Request 730. The UE ID 722 generated by the MME 706 may be unique within the MME 706. For example, the MME Temporary Mobile Subscriber Identity (M-TMSI), which 4 bytes, may be used as the UE ID 722. The Create Session Request 730 may contain both the UE ID 722 and Application Server Information as above. The Create Session Request 730 may be transmitted by the MME 706 to the S-GW 708, where it may then be forwarded to the P-GW 710.

The P-GW 710, having received the Create Session Request 730, may in response use address information of the Application Server to establish the Ry reference point for a NIP UE. Also in response to the Create Session Request, the P-GW 710 may transmit a Create Session Response 740 through the S-GW 708 to the MME 706. As above, the Create Session Response 740 for the NIP EPS bearer may include a bearer context indicating that the bearer is an EPS bearer, a bearer ID identifying the bearer, and a S5/S8-u P-GW Tunnel Endpoint Identifier (TEID) indicating the identification of the P-GW. The Create Session Response 740 may be free from the UL TFT and the UE IP address. However, unlike a Create Session Response shown in FIG. 6, since the UE ID 722 may not be known to the eNB 704 or UE, the Create Session Response 740 may replace the UE IP address of the UE with the UE ID 722.

The MME 706, in response to obtaining the Create Session Response, may transmit an Attach Accept 720 to the eNB 804 to forward to the UE. The Attach Accept 720 may contain the UE ID 722 for the UE and eNB 706 to use in subsequent communication using the NIP bearer. The MME 706, having generated the UE ID 722, may thus subsequently include the UE ID 722 in one of the S1-MME messages (e.g., the Attach Accept message) to the eNB 704 during the initial attach procedure.

If EPS bearer grouping is also enabled for the NIP EPS bearer and the corresponding S1 and S5/S8 tunnels have been established for the group, the signaling and messages among the MME 706, the S-GW 708 and the P-GW 710 may be eliminated. The S-GW 708 and the P-GW 710 may subsequently detect the new UE and its new UE ID based on the first uplink packet.

FIG. 8 illustrates establishment of another Non-IP EPS bearer in accordance with some embodiments. In FIG. 8, like the method of FIGS. 6 and 7, the UE (not shown) may initiate the process of establishing a NIP EPS bearer by transmitting an Attach Request to the eNB 804. Similar to the method of FIG. 7, the Attach Request may not contain the UE ID 822. The eNB 804 may relay the Attach Request to the MME 806. Unlike the method of FIG. 7, the MME 806 may not be responsible for determining the UE ID 822 during the initial attach procedure. The MME 806, in response to receiving the Attach Request from the eNB 804, may form a Create Session Request. However, the Create Session Request may contain the Application Server Information but not the UE ID 822. The Create Session Request may be transmitted by the MME 806 to the S-GW 808, where it may then be forwarded to the P-GW 810.

The P-GW 810, having received the Create Session Request 830, may generate the UE ID 822. The UE ID 822 may be unique within the P-GW 810. The P-GW 810 may also in response use address information of the Application Server to establish the Ry reference point for a NIP UE and may transmit a Create Session Response through the S-GW 808 to the MME 806. The Create Session Response for the NIP EPS bearer may include a bearer context indicating that the bearer is an EPS bearer, a bearer ID identifying the bearer, and a S5/S8-u P-GW Tunnel Endpoint Identifier (TEID) indicating the identification of the P-GW. The Create Session Response may be free from the UL TFT and the UE IP address. The Create Session Response may replace the UE IP address of the UE with the UE ID 822.

The MME 806, in response to obtaining the Create Session Response, may transmit an Attach Accept 820 to the eNB 804 to forward to the UE. The Attach Accept 820 may contain the UE ID 822 for the UE and eNB 806 to use in subsequent communication using the NIP bearer. The MME 806, having generated the UE ID 822, may thus subsequently include the UE ID 822 in one of the S1-MME messages (e.g., the Attach Accept message) to the eNB 804 during the initial attach procedure.

Thus, during the initial attach procedure, the P-GW 810 may include the UE ID 822 in one of the S5/S8 and S11 messages (e.g., a Create Session Response) to the MME 806. The MME 806 may subsequently forward the UE ID 822 to the eNB 804 using one of the S11-MME messages (e.g. Attach Accept) between the MME 806 and the eNB 804.

FIGS. 9A and 9B illustrate establishment of a Non-IP EPS bearer with inexplicit UE identification and corresponding data packet in accordance with some embodiments. As above, the UE (not shown) may initiate the process of establishing a NIP EPS bearer by transmitting an Attach Request to the eNB 904. The Attach Request may not contain the UE ID. The eNB 904 may relay the Attach Request to the MME 906. The MME 906, in response to receiving the Attach Request from the eNB 904, may form a Create Session Request. The Create Session Request may contain the Application Server Information. The Create Session Request may be transmitted by the MME 906 to the S-GW 908, where it may then be forwarded to the P-GW 910. The P-GW 910, having received the Create Session Request, may use address information of the Application Server to establish the Ry reference point for a NIP UE and may transmit a Create Session Response through the S-GW 908 to the MME 906. The Create Session Response for the NIP EPS bearer may include a bearer context indicating that the bearer is an EPS bearer, a bearer ID identifying the bearer, and a S5/S8-u P-GW Tunnel Endpoint Identifier (TEID) indicating the identification of the P-GW. The MME 906, in response to obtaining the Create Session Response, may transmit an Attach Accept 920 to the eNB 904 to forward to the UE.

In this case, none of the Attach Request, Create Session Request, Create Session Response and Attach Accept 920 may contain a UE ID. In other words, no UE ID may be created explicitly during the initial attach procedure. In this case, the non-IP encapsulation may no longer be used and can be removed from the GTP-u packet 950, as shown in FIG. 9B. In other embodiments, a NIP T-PDU in a GTP-u Packet without the UE ID may be used. In such embodiments, a NIP header may contain the packet length field but not the UE ID field. The Non-IP EPS bearer of the UE may be uniquely identified by the S1 or S5/S8 TEID. In the process shown in FIG. 9A, because the TEID is used, the S1 or S5/S8 GTP-u tunnel may only be used to deliver traffic to a single UE. Thus, EPS bearer grouping may no longer be possible.

FIG. 10 illustrates handover of a Non-IP EPS bearer in accordance with some embodiments. In FIG. 10, the UE may be associated with a MME-based or P-GW based UE ID 1014. As shown, a source eNB or MME 1002 may determine, for example via a tracking area update (TAU) procedure or control signal-based measurements, that the UE is to be handed over to a target eNB 1004. The source eNB/MME 1002 may transmit a handover request 1010. The handover request 1010 may identify both the UE and the NIP bearer. This is to say that the NIP EPS bearer handover request 1010 may include a NIP EPS Bearer Indicator 1012. The NIP EPS bearer handover request 1010 may also include the UE ID 1014. The NIP EPS Bearer Indicator 1012 may be a bit field indicating that the bearer for handover is a NIP EPS bearer.

In response to receiving the NIP EPS bearer handover request 1010, the target eNB 1004 to which the UE is to be handed over may determine whether or not it supports a NIP EPS bearer. In response to the target eNB 1004 determining that NIP EPS bearers are supported, the target eNB may transmit a Handover Request Acknowledgement (ACK) to the source eNB/MME 1002. In response to the target eNB 1004 determining that NIP EPS bearers are not supported, the target eNB may reject the NIP EPS bearer handover request 1010 in a response to the source eNB/MME 1002. In some embodiments, the Non-IP EPS bearer handover request 1010 may include the UE ID 1014 if generated explicitly (e.g., by the eNB, MME or P-GW). The UE ID 1014, however, may not be included in the NIP EPS bearer handover request 1010 if the UE ID 1014 is generated inexplicitly as above. If the handover is a S1-based handover, the MME 1002 may send a NIP EPS bearer handover request 1010 with the new information to the target eNB 1004.

In embodiments in which the MME 1002 has been relocated during handover from the source MME 1002 to a target MME (not shown in FIG. 10), no impact to the handover process shown in FIG. 10 may result if the network-generated UE ID is generated explicitly by the P-GW or if it is generated inexplicitly. However, in embodiments in which the UE ID is generated by the MME 1002, the target MME may assign the UE a new UE ID 1012 for the Non-IP EPS bearer. After assigning the new UE ID, the target MME may communicate the new UE ID to the P-GW, source eNB and MME 1002, and target eNB 1004 to ensure that the new UE ID is used in the NIP header of GTP-u packets after handover. In particular, the target MME may transmit the UE ID to the target eNB 1004 in a handover request, the target MME may transmit the UE ID to the source MME 1002 in a Forward Relocation Response, the target MME may transmit the UE ID to the target S-GW (P-GW) in a Modify Bearer Request, and the source MME 1002 may transmit the UE ID to the source eNB 1002 in a handover command.

Figure 11:
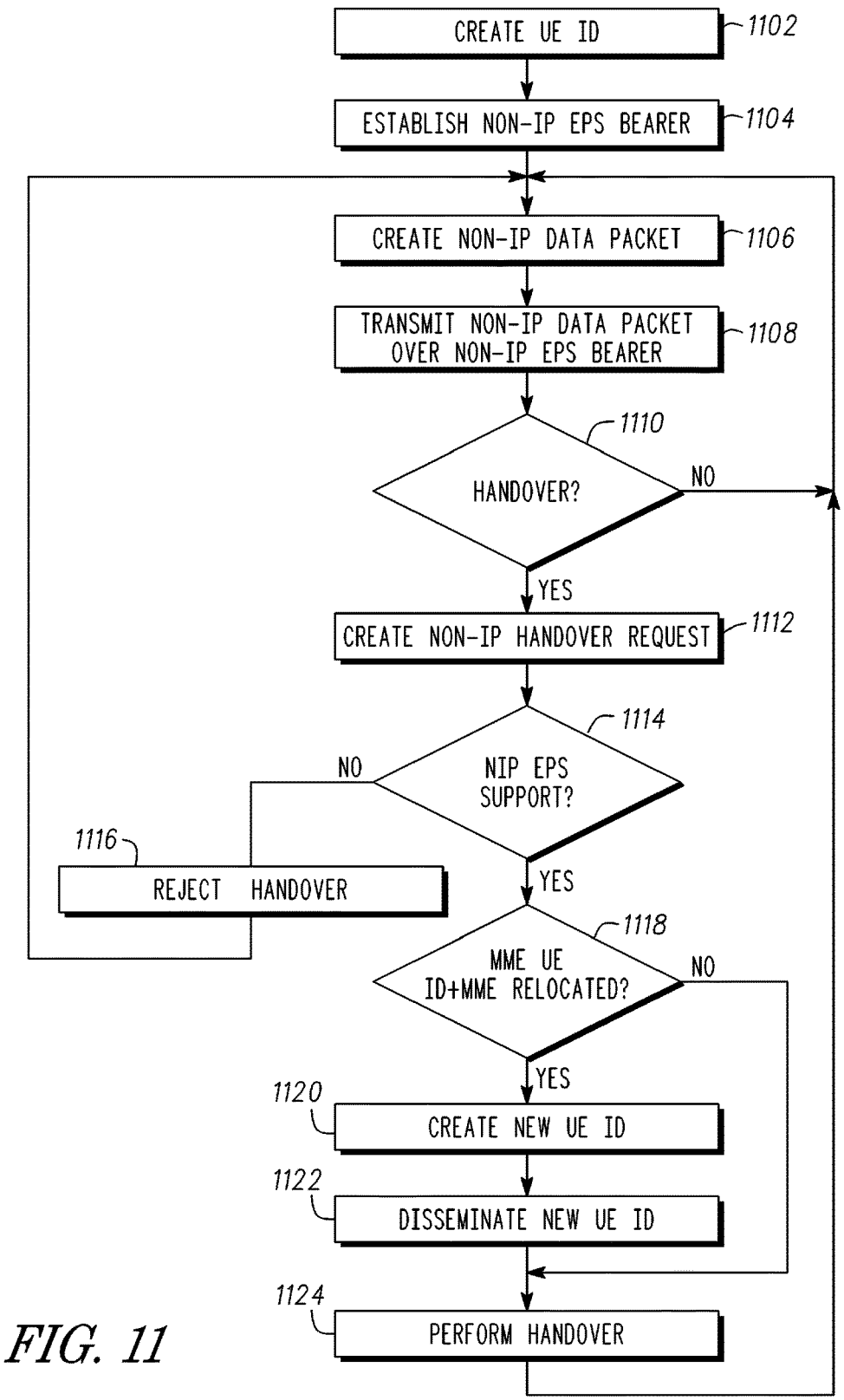
FIG. 11 illustrates a flowchart of a method of establishing a Non-IP EPS bearer, transmitting Non-IP data packets and handing over the Non-IP EPS bearer in accordance with some embodiments.

FIG. 11 illustrates a flowchart of a method of establishing a Non-IP EPS bearer, transmitting Non-IP data packets and handing over the Non-IP EPS bearer in accordance with some embodiments. The operations in FIG. 11 may be performed by one or more of the UE, eNB, MME and/or P-GW shown in FIGS. 1-10. In some embodiments, the operations may occur in a different order than that shown in FIG. 11.

In some embodiments, UE may transmit an Attach Request to an eNB to establish a Non-IP EPS bearer. The UE may, for example, attempt to attach upon power up. The Attach Request may be forwarded to an MME, which in response may generate a Create Session Request. The Create Session Request may be transmitted from the MME through a S-GW to a P-GW. At operation 1102, a UE ID may be generated. The UE ID may be generated by the UE or the eNB and transmitted in the Attach Request and the Create Session Request, generated by MME and transmitted in the Create Session Request but not the Attach Request, or generated by the P-GW and transmitted in a Create Session Response but not the Attach Request or Create Session Request.

The P-GW may at operation 1104 establish a Non-IP EPS bearer with an Application Server. The P-GW may transmit the Create Session Response to the MME through the S-GW. The Create Session Response may exclude the UL TFT and contain the UE ID if generated by the P-GW or may exclude any UE addressing information such as the UE ID and UE IP address if generated by the MME, eNB or UE.

The UE may receive an indication of the establishment of the Non-IP EPS bearer from an Attach Accept from the eNB. Depending on whether the UE ID originated at the UE or in the network, the Attach Accept may convey the UE ID to the UE for use in subsequent Non-IP packet formation. The UE, in response, may create a NIP packet at operation 1106. The NIP packet may contain a fixed length NIP header and a NIP user data packet. The NIP may contain a UE ID field containing the UE ID (internal and/or external UE ID, if not inexplicit) and a packet length field.

At operation 1108, the NIP packet may be transmitted over the NIP EPS bearer. The UE may transmit the NIP packet to the eNB, which in turn may communicate over an EPS bearer to the MME or P-GW. The P-GW may communicate over an EPS bearer to the Application Server to which the NIP packet is intended. The NIP EPS bearer may be a per-UE IP connection or a per-AS IP connection.

At operation 1110, the MME or eNB may determine whether handover is appropriate. For example, the MME or eNB may determine from a TAU or UE network-based control measurements that the UE has moved sufficiently to be served by a different eNB or MME. If not, communication between the UE and the Application Server may continue to communicate NIP data packets at operation 1106.

If at operation 1110, the MME or eNB determines that handover for the UE is appropriate, the eNB or MME may create a NIP handover request at operation 1112. The eNB/MME 1002 may transmit the handover request to a target eNB. The handover request may identify both the UE and that the bearer is to be a NIP EPS bearer.

Unfortunately, not all target eNBs may be able to support all types of EPS bearers. Thus, at operation 1114, in response to receiving the NIP EPS bearer handover request, the target eNB may determine whether or not it supports a NIP EPS bearer.

If at operation 1114, the target eNB determine that it is not able to support the NIP EPS bearer, at operation 1116, the target eNB may transmit a reject handover message to the eNB/MME. The eNB/MME may in response either select a different potential target eNB for handover, may continue to serve the UE using the NIP EPS bearer, may establish an IP EPS bearer and attempt to handover to the target eNB, or may simply drop the connection with the UE if no viable alternative exists.

In response to the target eNB determining that NIP EPS bearers are supported, the target eNB may transmit a Handover Request Acknowledgement (ACK) to the eNB/MME. In response, at operation 1118, the MME may determine where the UE ID was located and whether a target MME is to be used. This is to say that the MME may determine at operation 1118 to hand over control of the UE to another MME.

If at operation 1118 the MME determines that handover to a target MME is appropriate. The Non-IP EPS bearer handover request may include the UE ID if generated explicitly (e.g., by the eNB, MME or P-GW) or may not if the UE ID is generated inexplicitly. If the UE ID is generated by the UE, P-GW or inexplicitly, for example, the UE ID may remain the same. However, if the UE ID is MME-specific, a new UE ID may be generated. Thus, at operation 1120, a new UE ID may be created by the target MME if not included in the NIP EPS bearer handover request.

After assigning the new UE ID, the target MME may disseminate the new UE ID to the P-GW, source eNB and MME, and target eNB to ensure that the new UE ID is used in the NIP header of GTP-u packets after handover. At operation 1124, handover may then be completed and the UE may continue at operation 1106 to communicate NIP packets to the Application Server using the NIP EPS bearer.

Embodiments described herein may be implemented into a system using any suitably configured hardware and/or software. FIG. 12 illustrates example components of a UE in accordance with some embodiments. In some embodiments, the UE 1200 may include application circuitry 1202, baseband circuitry 1204, Radio Frequency (RF) circuitry 1206, front-end module (FEM) circuitry 1208 and one or more antennas 1210, coupled together at least as shown.

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204e of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204f. The audio DSP(s) 1204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c. The filter circuitry 1206c may include a low-pass filter (LPF), although the scope of the embodiments is not limited in this respect.

In some embodiments, the mixer circuitry 1206a of the receive signal path and the mixer circuitry 1206a of the transmit signal path may include two or more mixers and may be arranged for quadrature downconversion and/or upconversion respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and/or direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE 1200 may include additional elements such as, for example, memory/storage, display, camera, sensor, and/or input/output (I/O) interface.

Example 1 is an apparatus of a user equipment (UE) comprising: a transceiver configured to communicate with an evolved NodeB (eNB) using Internet Protocol (IP) data and non-IP (NIP) data; and processing circuitry arranged to: determine whether to transmit IP data or NIP data; in response to a determination to transmit IP data, encapsulate and compress user data and a header using a Transmission Control Protocol/Internet Protocol (TCP/IP) stack to form IP packets and configure the transceiver to transmit the IP packets to the eNB; in response to a determination to transmit the NIP data, configure the transceiver to transmit the NIP data to the eNB using a non-IP Evolved Packet switched System (EPS) bearer that the NIP data comprises a tunneling NIP data packet (T-PDU) that comprises a NIP header and a NIP user data packet free from TCP/IP encapsulation and header compression, and the NIP header comprises user identification and packet length.

In Example 2, the subject matter of Example 1 optionally includes that the processing circuitry is further arranged to: in response to the determination to transmit the IP data, select between a default and dedicated EPS bearer for transmission of the IP packets to the eNB when an IP-based EPS bearer is activated, and in response to the determination to transmit the NIP data, limit EPS bearer selection for transmission of the T-PDU packets to the eNB to a single EPS bearer.

In Example 3, the subject matter of any one or more of Examples 1-2 optionally include that: the T-PDU comprises a fixed length NIP header and a NIP user data packet for a NIP application, and the NIP header comprises: a packet length field that indicates a length of the NIP user data packet, and a UE ID field to uniquely identify the UE that is a terminus of the NIP packet, the UE ID field comprising an identifier, which is one of: based on NIP information of the UE and originating at the UE, and assigned by a network entity for the UE.

In Example 4, the subject matter of any one or more of Examples 1-3 optionally include that: the UE is a Machine Type Communication (MTC) UE.

In Example 5, the subject matter of any one or more of Examples 1-4 optionally include, further comprising: an antenna configured to provide communications between the transceiver and the eNB.

Example 6 is an apparatus of a Packet Data Network (P-GW) comprising: an interface configured to communicate with an evolved NodeB (eNB), an Application Server (AS) and a mobility management entity (MME) through a serving gateway (S-GW); and processing circuitry arranged to: configure the interface to receive non-IP (NIP) data of user equipment (UE) via a non-IP Evolved Packet switched System (EPS) bearer, determine the AS from the NIP data, and configure the interface to transmit the NIP data to the AS using an Application Proxy Function (APF) on an Ry reference point via a non-IP Evolved Packet switched System (EPS) bearer that the NIP data comprises a tunneling NIP data packet (T-PDU) that comprises a NIP header and a NIP user data packet free from TCP/IP encapsulation and header compression, and the NIP header comprises user identification and packet length.

In Example 7, the subject matter of Example 6 optionally includes that the Ry reference point supports at least one of: a per UE IP connection in which an individual IP connection is established for each of a plurality of UEs, at least one of a TCP and UDP port number at the P-GW differentiating the UEs, and a per AS IP connection in which an IP connection is established for each AS and data packets of all UEs associated with the AS are delivered using a same IP connection, a UE ID field in the NIP header used to differentiate UEs.

In Example 8, the subject matter of any one or more of Examples 6-7 optionally include that: the T-PDU comprises a fixed length NIP header and a NIP user data packet for a NIP application, and the NIP header comprises: a packet length field that indicates a length of the NIP user data packet, and a UE ID field to uniquely identify the UE that is a terminus of the NIP packet, the UE ID field comprising an identifier, which is one of: based on NIP information of the UE and originating at the UE, and assigned by a network entity for the UE.

In Example 9, the subject matter of Example 8 optionally includes that: a first UE ID field used for tunneling between the eNB and the P-GW is an internal UE ID and a second UE ID field used for tunneling for between the P-GW and the AS is an external UE ID, each of a length and value of the internal and external UE ID being independent, the P-GW is configured to map between the internal and external UE ID.

In Example 10, the subject matter of any one or more of Examples 8-9 optionally include that the processing circuitry is further arranged to: configure the interface to receive a Create Session Request from the MME through the S-GW, the Create Session Request comprising a UE ID to establish the Ry reference point with the AS for the UE.

In Example 11, the subject matter of Example 10 optionally includes that: the Create Session Request comprises Application Server Info, the Application Server Info comprising IP address Type, IP address, Protocol Type and Port Number and one of: received by the interface from one of: the MME in the Create Session Request, and a subscription profile repository (SPR) containing subscription information of the UE, pre-configured in the P-GW, and obtained from UE through a Non-Access Stratum (NAS) message during an initial attach procedure.

In Example 12, the subject matter of any one or more of Examples 10-11 optionally include that the processing circuitry is further arranged to: in response to receiving the Create Session Request, configure the interface to transmit a Create Session Response through the S-GW to the MME, the Create Session Response comprising a bearer context indicating EPS, a bearer ID, and a S5/S8-u P-GW Tunnel Endpoint Identifier (TEID) and being free from a UE IP address and an Up Link Traffic Flow Template (UL TFT).

In Example 13, the subject matter of any one or more of Examples 8-12 optionally include that: the UE ID comprises an identification that is consistent when the UE moves between eNBs and is able to be used over S1 or S5/S8 GTP-u tunnels.

In Example 14, the subject matter of any one or more of Examples 8-13 optionally include that the processing circuitry is further arranged to: configure the interface to receive the UE ID in an Attach Request from the eNB through the MME in a Create Session Request from the MME during an initial attach procedure of the UE.

In Example 15, the subject matter of any one or more of Examples 8-14 optionally include that the processing circuitry is further arranged to: configure the interface to receive the UE ID from the MME in a Create Session Request during an initial attach procedure of the UE and provide the UE ID to the eNB through the MME in an Attach Accept message, the UE ID created in the MME without having been provided from the eNB in an Attach Request from the eNB.

In Example 16, the subject matter of any one or more of Examples 8-15 optionally include that the processing circuitry is further arranged to: generate the UE ID such that the UE ID originates at the P-GW, and configure the interface to transmit the UE ID to the MME in a Create Session Response.

In Example 17, the subject matter of any one or more of Examples 6-16 optionally include that: the processing circuitry is further arranged to configure the interface to participate in an initial attach procedure of the UE, a Create Session Request from and a Create Session Response to the eNB through the S-GW free from a UE identification (ID), and the T-PDU comprises a fixed length NIP header and a NIP user data packet for a NIP application, and the NIP header comprises a packet length field that indicates a length of the NIP user data packet and is free from the UE ID, such that the GTP-u packet is free from NIP encapsulation.

Example 18 is an apparatus of a mobility management entity (MME) comprising: an interface configured to communicate with an evolved NodeB (eNB) and a Packet Data Network (P-GW) through a serving gateway (S-GW); and processing circuitry arranged to: configure the interface to receive an Attach Request of user equipment (UE) from the eNB; in response to receiving the Attach Request, configure the interface to transmit a Create Session Request for transmission of non-IP (NIP) data of user equipment (UE) to the P-GW; configure the interface to receive a Create Session Response from the P-GW in response to transmitting the Create Session Request; and configure the interface to transmit an Attach Accept for the UE to the eNB in response to receiving the Create Session Response, the Attach Accept comprising a UE identifier (UE ID), the UE ID one of based on NIP information of the UE and assigned by a network entity for the UE, to uniquely identify the UE that is a terminus of the NIP packet that the NIP data comprises a tunneling NIP data packet (T-PDU) that comprises a NIP header and a NIP user data packet free from TCP/IP encapsulation and header compression, and the NIP header comprises the UE ID and packet length.

In Example 19, the subject matter of Example 18 optionally includes that: the Create Session Request message comprises an Application Server Info parameter and the UE ID, the Application Server Info parameter comprises IP address Type, IP address, Protocol Type and Port Number, and the Create Session Response comprises a bearer context indicating EPS, a bearer ID, and a S1-u S-GW Tunnel Endpoint Identifier (TEID) and being free from a UE IP address and an Up Link Traffic Flow Template (UL TFT).

In Example 20, the subject matter of Example 19 optionally includes that the processing circuitry is further arranged to: extract the UE ID from the Attach Request and use the extracted UE ID in the Create Session Request.

In Example 21, the subject matter of any one or more of Examples 19-20 optionally includes that the processing circuitry is further arranged to: generate the UE ID and use the generated UE ID in the Create Session Request free from receiving the UE ID in the Attach Request.

In Example 22, the subject matter of any one or more of Examples 18-21 optionally include that: the Create Session Request message comprises an Application Server Info parameter, the Application Server Info parameter comprises IP address Type, IP address, Protocol Type and Port Number, and the Create Session Response comprises the UE ID, a bearer context indicating EPS, a bearer ID, and a S1-u S-GW Tunnel Endpoint Identifier (TEID) and being free from a UE IP address and an Up Link Traffic Flow Template (UL TFT).

In Example 23, the subject matter of Example 22 optionally includes, the processing circuitry is further arranged to: extract the UE ID from the Create Session Response, the Create Session Request message being free from the UE ID.

In Example 24, the subject matter of any one or more of Examples 18-23 optionally include that the processing circuitry is further arranged to: configure the interface to transmit a NIP EPS bearer handover request to a target eNB, the NIP EPS bearer handover request comprising a NIP EPS Bearer Indicator, the NIP EPS Bearer Indicator indicating that a bearer for handover is a NIP EPS bearer, and receive a rejection to the handover request from the target eNB when the target eNB does not support an NIP EPS bearer.

In Example 25, the subject matter of Example 24 optionally includes that: the Non-IP EPS bearer handover request comprises the UE ID when the UE ID is generated by the eNB, MME or P-GW and being free from the UE ID when the UE ID is generated by the UE.

Example 26 is a non-transitory computer-readable storage medium that stores instructions for execution by one or more processors of a mobility management entity (MME) to configure the MME to communicate with an evolved NodeB (eNB) and a Packet Data Network (P-GW) through a serving gateway (S-GW), the one or more processors to configure the MME to: transmit a Create Session Request for transmission of non-IP (NIP) data of user equipment (UE) to the P-GW; receive a Create Session Response from the P-GW in response to transmitting the Create Session Request; and in response to receiving the Create Session Response, transmit control information to the eNB comprising a UE identifier (UE ID) originating at one of the UE, the MME and the P-GW that the NIP data comprises a tunneling NIP data packet (T-PDU) that comprises a NIP header and a NIP user data packet free from TCP/IP encapsulation and header compression, and the NIP header comprises a UE identification (ID), and the Create Session Response comprises a bearer context indicating EPS, a bearer ID, and a S1-u S-GW Tunnel Endpoint Identifier (TEID) and being free from a UE IP address and an Up Link Traffic Flow Template (UL TFT).

In Example 27, the subject matter of Example 26 optionally includes that one of: a) the Create Session Request message comprises the UE ID, and the Create Session Response is free from the UE ID, and b) the Create Session Request message is free from the UE ID, and the Create Session Response comprises the UE ID.

In Example 28, the subject matter of any one or more of Examples 26-27 optionally include that the one or more processors further configure the UE to: transmit a NIP EPS bearer handover request to a target eNB, the NIP EPS bearer handover request comprising a NIP EPS Bearer Indicator and the UE ID when the UE ID is generated by the one of the eNB, MME and P-GW and being free from the UE ID when the UE ID is generated by the UE, the NIP EPS Bearer Indicator indicating that a bearer for handover is a NIP EPS bearer, and receive a rejection to the handover request from the target eNB when the target eNB does not support an NIP EPS bearer.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE) comprising:
    a transceiver configured to communicate with an evolved NodeB (eNB) using Internet Protocol (IP) data and non-IP (NIP) data; and
    processing circuitry arranged to:
        determine whether to transmit IP data or NIP data;
        in response to a determination to transmit IP data, encapsulate and compress user data and a header using a Transmission Control Protocol/Internet Protocol (TCP/IP) stack to form IP packets and configure the transceiver to transmit the IP packets to the eNB;
        in response to a determination to transmit the NIP data, configure the transceiver to transmit the NIP data to the eNB using a non-IP Evolved Packet switched System (EPS) bearer, wherein the NIP data comprises a tunneling NIP data packet (T-PDU) that comprises a NIP header and a NIP user data packet free from TCP/IP encapsulation and header compression, and the NIP header comprises user identification and packet length.

2. The apparatus of claim 1, wherein the processing circuitry is further arranged to:
    in response to the determination to transmit the IP data, select between a default and dedicated EPS bearer for transmission of the IP packets to the eNB when an IP-based EPS bearer is activated, and
    in response to the determination to transmit the NIP data, limit EPS bearer selection for transmission of the T-PDU packets to the eNB to a single EPS bearer.

3. The apparatus of claim 1, wherein:
    the T-PDU comprises a fixed length NIP header and a NIP user data packet for a NIP application, and
    the NIP header comprises:
        a packet length field that indicates a length of the NIP user data packet, and
        a UE ID field to uniquely identify the UE that is a terminus of the NIP packet, the UE ID field comprising an identifier, which is one of:
            based on NIP information of the UE and originating at the UE, and
            assigned by a network entity for the UE.

4. The apparatus of claim 1, wherein:
    the UE is a Machine Type Communication (MTC) UE.

5. The apparatus of claim 1, further comprising:
    an antenna configured to provide communications between the transceiver and the eNB.

6. An apparatus of a Packet Data Network (P-GW) comprising:
    an interface configured to communicate with an evolved NodeB (eNB), an Application Server (AS) and a mobility management entity (MME) through a serving gateway (S-GW); and
    processing circuitry arranged to:
        configure the interface to receive non-IP (NIP) data of user equipment (UE) via a non-IP Evolved Packet switched System (EPS) bearer,
        determine the AS from the NIP data, and
        configure the interface to transmit the NIP data to the AS using an Application Proxy Function (APF) on an Ry reference point via a non-IP Evolved Packet switched System (EPS) bearer,
        wherein the NIP data comprises a tunneling NIP data packet (T-PDU) that comprises a NIP header and a NIP user data packet free from TCP/IP encapsulation and header compression, and the NIP header comprises user identification and packet length.

7. The apparatus of claim 6, wherein the Ry reference point supports at least one of:
    a per UE IP connection in which an individual IP connection is established for each of a plurality of UEs, at least one of a TCP and UDP port number at the P-GW differentiating the UEs, and a per AS IP connection in which an IP connection is established for each AS and data packets of all UEs associated with the AS are delivered using a same IP connection, a UE ID field in the NIP header used to differentiate UEs.

8. The apparatus of claim 6, wherein:
the T-PDU comprises a fixed length NIP header and a NIP user data packet for a NIP application, and
the NIP header comprises:
a packet length field that indicates a length of the NIP user data packet, and
a UE ID field to uniquely identify the UE that is a terminus of the NIP packet, the UE ID field comprising an identifier, which is one of:
based on NIP information of the UE and originating at the UE, and
assigned by a network entity for the UE.

9. The apparatus of claim 8, wherein:
a first UE ID field used for tunneling between the eNB and the P-GW is an internal UE ID and a second UE ID field used for tunneling for between the P-GW and the AS is an external UE ID, each of a length and value of the internal and external UE ID being independent,
the P-GW is configured to map between the internal and external UE ID.

10. The apparatus of claim 8, wherein the processing circuitry is further arranged to:
configure the interface to receive a Create Session Request from the MME through the S-GW, the Create Session Request comprising a UE ID to establish the Ry reference point with the AS for the UE.

11. The apparatus of claim 10, wherein:
the Create Session Request comprises Application Server Info, the Application Server Info comprising IP address Type, IP address, Protocol Type and Port Number and one of:
received by the interface from one of:
the MME in the Create Session Request, and
a subscription profile repository (SPR) containing subscription information of the UE,
pre-configured in the P-GW, and
obtained from UE through a Non-Access Stratum (NAS) message during an initial attach procedure.

12. The apparatus of claim 10, wherein the processing circuitry is further arranged to:
in response to receiving the Create Session Request, configure the interface to transmit a Create Session Response through the S-GW to the MME, the Create Session Response comprising a bearer context indicating EPS, a bearer ID, and a S5/S8-u P-GW Tunnel Endpoint Identifier (TEID) and being free from a UE IP address and an Up Link Traffic Flow Template (UL TFT).

13. The apparatus of claim 8, wherein:
the UE ID comprises an identification that is consistent when the UE moves between eNBs and is able to be used over S1 or S5/S8 GTP-u tunnels.

14. The apparatus of claim 8, wherein the processing circuitry is further arranged to:
configure the interface to receive the UE ID in an Attach Request from the eNB through the MME in a Create Session Request from the MME during an initial attach procedure of the UE.

15. The apparatus of claim 8, wherein the processing circuitry is further arranged to:
configure the interface to receive the UE ID from the MME in a Create Session Request during an initial attach procedure of the UE and provide the UE ID to the eNB through the MME in an Attach Accept message, the UE ID created in the MME without having been provided from the eNB in an Attach Request from the eNB.

16. The apparatus of claim 8, wherein the processing circuitry is further arranged to:
generate the UE ID such that the UE ID originates at the P-GW, and
configure the interface to transmit the UE ID to the MME in a Create Session Response.

17. The apparatus of claim 6, wherein:
the processing circuitry is further arranged to configure the interface to participate in an initial attach procedure of the UE, a Create Session Request from and a Create Session Response to the eNB through the S-GW free from a UE identification (ID), and
the T-PDU comprises a fixed length NIP header and a NIP user data packet for a NIP application, and the NIP header comprises a packet length field that indicates a length of the NIP user data packet and is free from the UE ID, such that the GTP-u packet is free from NIP encapsulation.

18. An apparatus of a mobility management entity (MME) comprising:
an interface configured to communicate with an evolved NodeB (eNB) and a Packet Data Network (P-GW) through a serving gateway (S-GW); and
processing circuitry arranged to:
configure the interface to receive an Attach Request of user equipment (UE) from the eNB;
in response to receiving the Attach Request, configure the interface to transmit a Create Session Request for transmission of non-IP (NIP) data of user equipment (UE) to the P-GW;
configure the interface to receive a Create Session Response from the P-GW in response to transmitting the Create Session Request; and
configure the interface to transmit an Attach Accept for the UE to the eNB in response to receiving the Create Session Response, the Attach Accept comprising a UE identifier (UE ID), the UE ID one of based on NIP information of the UE and assigned by a network entity for the UE, to uniquely identify the UE that is a terminus of the NIP packet,
wherein the NIP data comprises a tunneling NIP data packet (T-PDU) that comprises a NIP header and a NIP user data packet free from TCP/IP encapsulation and header compression, and the NIP header comprises the UE ID and packet length.

19. The apparatus of claim 18, wherein:
the Create Session Request message comprises an Application Server Info parameter and the UE ID, the Application Server Info parameter comprises IP address Type, IP address, Protocol Type and Port Number, and
the Create Session Response comprises a bearer context indicating EPS, a bearer ID, and a S1-u S-GW Tunnel Endpoint Identifier (TEID) and being free from a UE IP address and an Up Link Traffic Flow Template (UL TFT).

20. The apparatus of claim 19, wherein the processing circuitry is further arranged to:
extract the UE ID from the Attach Request and use the extracted UE ID in the Create Session Request.

21. The apparatus of claim 19, wherein the processing circuitry is further arranged to:

generate the UE ID and use the generated UE ID in the Create Session Request free from receiving the UE ID in the Attach Request.

22. The apparatus of claim 18, wherein:
the Create Session Request message comprises an Application Server Info parameter, the Application Server Info parameter comprises IP address Type, IP address, Protocol Type and Port Number, and
the Create Session Response comprises the UE ID, a bearer context indicating EPS, a bearer ID, and a S1-u S-GW Tunnel Endpoint Identifier (TEID) and being free from a UE IP address and an Up Link Traffic Flow Template (UL TFT).

23. The apparatus of claim 22, the processing circuitry is further arranged to:
extract the UE ID from the Create Session Response, the Create Session Request message being free from the UE ID.

24. The apparatus of claim 18, wherein the processing circuitry is further arranged to:
configure the interface to transmit a NIP EPS bearer handover request to a target eNB, the NIP EPS bearer handover request comprising a NIP EPS Bearer Indicator, the NIP EPS Bearer Indicator indicating that a bearer for handover is a NIP EPS bearer, and
receive a rejection to the handover request from the target eNB when the target eNB does not support an NIP EPS bearer.

25. The apparatus of claim 24, wherein:
the Non-IP EPS bearer handover request comprises the UE ID when the UE ID is generated by the eNB, MME or P-GW and being free from the UE ID when the UE ID is generated by the UE.

26. A non-transitory computer-readable storage medium that stores instructions for execution by one or more processors of a mobility management entity (MME) to configure the MME to communicate with an evolved NodeB (eNB) and a Packet Data Network (P-GW) through a serving gateway (S-GW), the one or more processors to configure the MME to:

transmit a Create Session Request for transmission of non-IP (NIP) data of user equipment (UE) to the P-GW;
receive a Create Session Response from the P-GW in response to transmitting the Create Session Request; and
in response to receiving the Create Session Response, transmit control information to the eNB comprising a UE identifier (UE ID) originating at one of the UE, the MME and the P-GW,
wherein the NIP data comprises a tunneling NIP data packet (T-PDU) that comprises a NIP header and a NIP user data packet free from TCP/IP encapsulation and header compression, and the NIP header comprises a UE identification (ID), and
the Create Session Response comprises a bearer context indicating EPS, a bearer ID, and a S1-u S-GW Tunnel Endpoint Identifier (TEID) and being free from a UE IP address and an Up Link Traffic Flow Template (UL TFT).

27. The medium of claim 26, wherein one of:
a) the Create Session Request message comprises the UE ID, and
the Create Session Response is free from the UE ID, and
b) the Create Session Request message is free from the UE ID, and
the Create Session Response comprises the UE ID.

28. The medium of claim 26, wherein the one or more processors further configure the UE to:
transmit a NIP EPS bearer handover request to a target eNB, the NIP EPS bearer handover request comprising a NIP EPS Bearer Indicator and the UE ID when the UE ID is generated by the one of the eNB, MME and P-GW and being free from the UE ID when the UE ID is generated by the UE, the NIP EPS Bearer Indicator indicating that a bearer for handover is a NIP EPS bearer, and
receive a rejection to the handover request from the target eNB when the target eNB does not support an NIP EPS bearer.

* * * * *